(12) United States Patent
Stayman et al.

(10) Patent No.: US 9,177,374 B2
(45) Date of Patent: Nov. 3, 2015

(54) MODEL-BASED PROCESSING OF IMAGE DATA

(75) Inventors: Joseph Webster Stayman, Baltimore, MD (US); Jeffrey H. Siewerdsen, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 75 days.

(21) Appl. No.: 14/006,592

(22) PCT Filed: Mar. 26, 2012

(86) PCT No.: PCT/US2012/030578
§ 371 (c)(1),
(2), (4) Date: Sep. 20, 2013

(87) PCT Pub. No.: WO2012/129566
PCT Pub. Date: Sep. 27, 2012

(65) Prior Publication Data
US 2014/0010431 A1 Jan. 9, 2014

Related U.S. Application Data

(60) Provisional application No. 61/467,187, filed on Mar. 24, 2011.

(51) Int. Cl.
*G06K 9/00* (2006.01)
*G06T 7/00* (2006.01)
*G06T 11/00* (2006.01)

(52) U.S. Cl.
CPC .............. *G06T 7/0012* (2013.01); *G06T 7/0046* (2013.01); *G06T 11/006* (2013.01); *G06T 2207/10081* (2013.01); *G06T 2207/30052* (2013.01); *G06T 2211/424* (2013.01)

(58) Field of Classification Search
None
See application file for complete search history.

(56) References Cited

U.S. PATENT DOCUMENTS

| | | | |
|---|---|---|---|
| 6,898,302 B1 | 5/2005 | Brummer | |
| 7,369,695 B2 | 5/2008 | Zettel et al. | |
| 7,542,791 B2 * | 6/2009 | Mire et al. | 600/407 |
| 7,778,392 B1 | 8/2010 | Berman et al. | |
| 7,812,961 B2 | 10/2010 | Yamaguchi | |
| 8,366,719 B2 * | 2/2013 | Markey et al. | 606/104 |
| 8,644,568 B1 * | 2/2014 | Hoffmann et al. | 382/128 |
| 8,660,331 B2 * | 2/2014 | Fernandez Dell Oca | 382/132 |

(Continued)

OTHER PUBLICATIONS

Stayman et al., "WE-A-301-04: Model-Based Known Component Reconstructions for Computer Tomography," Medical Physics, vol. 38, 2011, p. 3796.

(Continued)

*Primary Examiner* — Soo Park
(74) *Attorney, Agent, or Firm* — Venable LLP; Henry J. Daley

(57) ABSTRACT

An imaging system for processing image data of an object containing a component. The imaging system includes an imaging device arranged to obtain image data and a processor. The processor is adapted to receive the image data from the imaging device, obtain a component model for the component, obtain an imaging device model for the imaging device, construct an unconstrained objective function based on the component model and the imaging device model, and construct a model of the object containing the component based on the unconstrained objective function and the image data, and a display device adapted to display an image for the object containing the component based on the model.

17 Claims, 10 Drawing Sheets

(56) References Cited

U.S. PATENT DOCUMENTS

2006/0247513 A1 11/2006 Wang et al.
2010/0217336 A1* 8/2010 Crawford et al. ............ 606/86 R
2011/0268325 A1* 11/2011 Teichman et al. ............. 382/128

OTHER PUBLICATIONS

International Search eport and Written Opinion of PCT/US2012/030578.
"Handbook of Pharmaceutical Excipients"; "Handbook of Detergents, Part A: Properties", G. Broze, Ed., Marcel Dekker, New York, 1999.
Cevc, 2004, Adv Drug Deliv Rev 56: 675.
Cevc & Vierl, 2010 J Contr Rel 141: 277.
Cevc et al., 2008, Int J Pharm 360: 18-28.
Cevc, 2012, J Contr Rel, http://dx.doi.org/10.1016/j.jconrel.2012.01.005.
Elsayed et al., 2009, Pharm. Res. 26, 1332.
Guerrero et al., State-of-the-art on cone beam CT imaging for preoperative planning of implant placement. May 30, 2005. Accepted Dec. 13, 2005. Published online: Feb. 16, 2006. Springer-Verlag 2006.
Honeywell-Nguyen et al., 2006, J Liposome Res 16: 273.
Jones et al., The feasibility of polychromatic cone-beam x-ray fluorescence computed tomography (XFCT) imaging of gold nanoparticle-loaded objects: a Monte Carlo study. Phys Med Biol. Jun. 21, 2011;56 (12):3719-30. Epub May 31, 2011.
Lemmens et al., Suppression of Metal Artifacts in CT Using a Reconstruction Procedure that Combines MAP and Projection Completion. IEEE Trans Med Imaging. Feb. 2009;28(2):250-60.
Liu et al., Metal artifact reduction image reconstruction algorithm for CT of implanted metal orthopedic devices: a work in progress, Oct. 30, 2008. Accepted: Nov. 20, 2008. Published online: Jan. 14, 2009. Skeletal Radiology.
Meilinger et al., Metal artifact reduction in cone beam computed tomography using forward projected reconstruction information. Med Phys. Apr. 27, 2011.
Pasquali et al., 2008, Int J Pharma 356: 44.
Wachter of al., 2008, J. Drug Targeting 16: 611.
Willowson et al., Quantitative SPECT reconstruction using CT-derived corrections. 2008 Phys. Med. Biol. 53 3099.
Stayman, J.W. et al—"Likelihood-based CT Reconstruction of Objects Containing Known Components," Int'l Mtg on Fully3D Image Recon (Jul. 2011), submitted Jan. 13, 2011.
Barrett et al., "Artifacts in CT: recognition and avoidance," Radiographics, vol. 24, pp. 1679-1691, Nov.-Dec. 2004.
Chen, et al., "Prior image constrained compressed sensing (PICCS): a method to accurately reconstruct dynamic CT images from highly undersampled projection data sets," Med Phys, vol. 35, pp. 660-663, Feb. 2008.
Chun et al., "Joint image reconstruction and nonrigid motion estimation with a simple penalty that encourages local invertibility.," in Proc. SPIE 7258, Medical Imaging 2009: Phys. Med. Im., 2009, p. 72580U.
Daly et al., "Percutaneous abdominal and pelvic interventional procedures using CT fluoroscopy guidance," AJR Am J Roentgenol, vol. 173, pp. 637-44, Sep. 1999.
De Man et al., "An iterative maximum-likelihood polychromatic algorithm for CT," IEEE Trans Med Imaging, vol. 20, pp. 999-1008, Oct. 2001.
De Man et al., "Metal streak artifacts in X-ray computed tomography: A simulation study," IEEE Trans Nuclear Science, vol. 46, pp. 691-696, 1999.
De Man et al., "Reduction of metal steak artifacts in X-ray computed tomography using a transmission maximum a posteriori algorithm," IEEE Trans Nuclear Science, vol. 47, pp. 977981, 2000.
De Pierro, "On the relation between the ISRA and the EM algorithm for positron emission tomography," IEEE Trans Med Imaging, vol. 12, pp. 328-333, 1993.
Elbakri et al., "Segmentation-free statistical image reconstruction for polyenergetic x-ray computed tomography with experimental validation," Phys Med Biol, vol. 48, pp. 2453-2477, Aug. 7, 2003.
Elbakri and J. A. Fessler, "Statistical image reconstruction for polyenergetic X-ray computed tomography," IEEE Trans Med Imaging, vol. 21, pp. 89-99, Feb. 2002.
Erdogan and J. A. Fessler, "Monotonic algorithms for transmission tomography," IEEE Trans Med Imaging, vol. 18, pp. 801-814, Sep. 1999.
Erdogan and J. A. Fessler, "Ordered subsets algorithms for transmission tomography," Phys Med Biol, vol. 44, pp. 2835-2851, Nov. 1999.
Fessler, "Optimization transfer approach to joint registration/reconstruction for motion-compensated image reconstruction," presented at the ISBI, 2010.
Glover and N. J. Pelc, "An algorithm for the reduction of metal clip artifacts in CT reconstructions," Med Phys, vol. 8, pp. 799-807, Nov.-Dec. 1981.
Hebert and R. Leahy, "A generalized EM algorithm for 3-D Bayesian reconstruction from Poisson data using Gibbs priors," IEEE Trans Med Imaging, vol. 8, pp. 194202, 1989.
Holly and K. T. Foley, "Three-dimensional fluoroscopy-guided percutaneous thoracolumbar pedicle screw placement. Technical note," J Neurosurg, vol. 99, pp. 324-329, Oct. 2003.
Jacobson and J. A. Fessler, "Joint estimation of image and deformation parameters in motion-corrected corrected PET," in Proc. IEEE Nuc. Sci. Symp. Med. Im. Conf, 2003, pp. 3290-3294.
Kalender, et al., "Reduction of CT artifacts caused by metallic implants," Radiology, vol. 164, pp. 576-577, Aug. 1987.
Lange, "Convergence of EM image reconstruction algorithms with Gibbs smoothing," IEEE Trans Med Imaging, vol. 9, pp. 439-446, 1990.
Li, et al., "Metal artifact suppression from reformatted projections in multislice helical CT using dual-front active contours," Med Phys, vol. 37,pp. 5155-5164, Oct. 2010.
Liu and J. Nocedal, "On the Limited Memory BFGS Method for Large-Scale Optimization," Mathematical Programming, vol. 45, pp. 503-528, Dec. 1989.
Long, et al., "3D forward and back-projection for X-ray CT using separable footprints," IEEE Trans Med Imaging, vol. 29, pp. 1839-1850, Nov. 2010.
Luenberger, Linear and nonlinear programming, 3rd ed. New York: Springer, 2007.
Medoff, et al., "Iterative Convolution Backprojection Algorithms for Image-Reconstruction from Limited Data," Journal of the Optical Society of America, vol. 73, pp. 1493-1500, 1983.
Murphy, et al., "Pose estimation of known objects during transmission tomographic image reconstruction," IEEE Trans Med Imaging, vol. 25, pp. 1392404, Oct. 2006.
Robertson, et al., "Total hip prosthesis metal-artifact suppression using iterative deblurring reconstruction," J Comput Assist Tomogr, vol. 21, pp. 293-298, Mar.-Apr. 1997.
Rinkel, et al., "Computed tomographic metal artifact reduction for the detection and quantitation of small features near large metallic implants: a comparison of published methods," J Comput Assist Tomogr, vol. 32, pp. 621-629, Jul.-Aug. 2008.
Siddon, "Fast calculation of the exact radiological path for a three-dimensional CT array," Med Phys, vol. 12, pp. 252-255, Mar.-Apr. 1985.
Siewerdsen, et al., "Volume CT with a flat-panel detector on a mobile, isocentric C-arm: Pre-clinical investigation in guidance of minimally invasive surgery," Medical Physics, vol. 32, pp. 241-254, Jan. 2005.
Snyder, et al., "Deblurring subject to nonnegativity constraints when known functions are present with application to object-constrained computerized tomography," IEEE Trans Med Imaging, vol. 20, pp. 1009-1017, Oct. 2001.
Srivastava et al., "Simplified statistical image reconstruction algorithm for polyenergetic X-ray CT," 2005 IEEE Nuclear Science Symposium Conference Record, vols. 1-5, pp. 1551-1555, 2005.
Stayman, et al., "Penalized-likelihood reconstruction for sparse data acquisitions with unregistered prior images and compressed sensing penalties," in SPIE Medical Imaging, 2011.

(56) References Cited

OTHER PUBLICATIONS

Stulberg, et al., "Monitoring pelvic osteolysis following total hip replacement surgery: an algorithm for surveillance," J Bone Joint Surg Am, vol. 84-A Suppl 2, pp. 116-122, 2002.

Thevenaz, et al., "Interpolation revisited," IEEE Trans Med Imaging, vol. 19, pp. 739-758, Jul. 2000.

Thibault, et al., "A three-dimensional statistical approach to improved image quality for multislice helical CT," Med Phys, vol. 34, pp. 4526-4544, Nov. 2007.

Vogel and M. E. Oman, "Fast, robust total variation-based reconstruction of noisy, blurred images," IEEE Trans Image Process, vol. 7, pp. 813-824, 1998.

Wang, et al., "Iterative deblurring for CT metal artifact reduction," IEEE Trans Med Imaging, vol. 15, pp. 657-664, 1996.

Wang, et al., "Iterative image reconstruction for CBCT using edge-preserving prior," Med Phys, vol. 36, pp. 252-260, Jan. 2009.

Wang, et al., "Reliability of three-dimensional fluoroscopy for detecting pedicle screw violations in the thoracic and lumbar spine," Neurosurgery, vol. 54, pp. 1138-1142; discussion 1142-3, May 2004.

Watzke and W. A. Kalender, "A pragmatic approach to metal artifact reduction in CT: merging of metal artifact reduced images," Eur Radiol, vol. 14, pp. 849-856, May 2004.

Williamson, et al., "Prospects for quantitative computed tomography imaging in the presence of foreign metal bodies using statistical image reconstruction," Med Phys, vol. 29, pp. 2404-2418, Oct. 2002.

\* cited by examiner

MODEL-BASED PROCESSING OF IMAGE DATA

CROSS-REFERENCE OF RELATED APPLICATION

This is a national stage application under 35 U.S.C. §371 of PCT/US2012/030578 filed Mar. 26, 2012, the entire contents of which are incorporated herein by reference and this application claims priority to U.S. Provisional Application No. 61/467,187 filed Mar. 24, 2011, the entire contents of which are hereby incorporated by reference.

This invention was made with Government support of Grant No. CA-127444, awarded by the National Institute of Health. The U.S. Government has certain rights in this invention.

BACKGROUND

1. Field of Invention

The current invention relates to processing image data, and more particularly to model-based processing of image data.

2. Discussion of Related Art

The contents of all references, including articles, published patent applications and patents referred to anywhere in this specification are hereby incorporated by reference.

In tomographic imaging, there are many situations in which portions of the image volume are known a priori. Examples in orthopedics include a component for which exact knowledge may be known, for example, pedicle screws and rods for spine surgery, knee and hip implants for joint replacements, and plates and screws for fixation in trauma cases. In image-guided procedures, surgical tools are often placed within the imaging field. When these components are metallic, measurements whose projections contain those elements can suffer from reduced signal-to-noise ratio due to photon starvation. Similarly, since reconstruction of highly attenuating components involves mathematical inversion of near zero projection values, algorithms tend to be very sensitive to any biases (e.g., due to polyenergetic effects). Both of these effects tend to produce streak artifacts in the reconstructed images [B. De Man, et al., "Metal streak artifacts in X-ray computed tomography: A simulation study," *IEEE Trans Nuclear Science*, vol. 46, pp. 691-696, 1999; J. F. Barrett and N. Keat, "Artifacts in CT: recognition and avoidance," *Radiographics*, vol. 24, pp. 1679-91, November-December 2004].

Such artifacts tend to be particularly troublesome since it is often the region immediately surrounding the component that is of diagnostic interest, which is exactly where the artifacts tend to be most pronounced. Particular situations where image quality in the neighborhood of a metallic component is critical include the visualization around implants for indications of subsidence or osteolysis [S. D. Stulberg, et al., "Monitoring pelvic osteolysis following total hip replacement surgery: an algorithm for surveillance," *J Bone Joint Surg Am*, vol. 84-A Suppl 2, pp. 116-22, 2002], assessment of pedicle screw placement to avoid critical structures in the spine [L. T. Holly and K. T. Foley, "Three-dimensional fluoroscopy-guided percutaneous thoracolumbar pedicle screw placement. Technical note," *J Neurosurg*, vol. 99, pp. 324-9, October 2003; M. Y. Wang, et al., "Reliability of three-dimensional fluoroscopy for detecting pedicle screw violations in the thoracic and lumbar spine," *Neurosurgery*, vol. 54, pp. 1138-42; discussion 1142-3, May 2004], and biopsy needle guidance [B. Daly, et al., "Percutaneous abdominal and pelvic interventional procedures using CT fluoroscopy guidance," *AJR Am J Roentgenol*, vol. 173, pp. 637-44, September 1999].

Various approaches have been developed to mitigate metal streak artifacts [B. De Man, et al., "Reduction of metal steak artifacts in X-ray computed tomography using a transmission maximum a posteriori algorithm," *IEEE Trans Nuclear Science, vol.* 47, pp. 977-981, 2000 2000; G. H. Glover and N. J. Pelc, "An algorithm for the reduction of metal clip artifacts in CT reconstructions," *Med Phys, vol.* 8, pp. 799-807, November-December 1981; W. A. Kalender, et al., "Reduction of CT artifacts caused by metallic implants," *Radiology*, vol. 164, pp. 576-7, August 1987; H. Li, et al., "Metal artifact suppression from reformatted projections in multislice helical CT using dual-front active contours," *Med Phys, vol.* 37, pp. 5155-64, October 2010; D. D. Robertson, et al., "Total hip prosthesis metal-artifact suppression using iterative deblurring reconstruction," *J Comput Assist Tomogr*, vol. 21, pp. 293-8, March-April 1997; G. Wang, et al., "Iterative deblurring for CT metal artifact reduction," *IEEE Trans Med Imaging*, vol. 15, pp. 657-64, 1996; O. Watzke and W. A. Kalender, "A pragmatic approach to metal artifact reduction in CT: merging of metal artifact reduced images," *Eur Radiol*, vol. 14, pp. 849-56, May 2004; B. P. Medoff, et al., "Iterative Convolution Backprojection Algorithms for Image-Reconstruction from Limited Data," *Journal of the Optical Society of America*, vol. 73, pp. 1493-1500, 1983; J. Rinkel, et al., "Computed tomographic metal artifact reduction for the detection and quantitation of small features near large metallic implants: a comparison of published methods," *J Comput Assist Tomogr*, vol. 32, pp. 621-9, July-August 2008].

Many methods consider measurements through metal to be missing data. The missing data can simply be eliminated from the reconstruction algorithm [B. P. Medoff, et al., "Iterative Convolution Backprojection Algorithms for Image-Reconstruction from Limited Data," *Journal of the Optical Society of America*, vol. 73, pp. 1493-1500, 1983], or may be filled in using values based on the neighborhood of the missing data [G. H. Glover and N. J. Pelc, "An algorithm for the reduction of metal clip artifacts in CT reconstructions," *Med Phys*, vol. 8, pp. 799-807, November-December 1981; W. A. Kalender, et al., "Reduction of CT artifacts caused by metallic implants," *Radiology*, vol. 164, pp. 576-7, August 1987]. However, rarely is the exact knowledge of the metal component used.

Tomographic imaging generally benefits from the incorporation of prior knowledge into the reconstruction algorithm. This is particularly true for situations that involve undersampling and low signal-to-noise. Methods that seek to correct for metal streak artifacts tend to require identification of spatial locations in the volume, or the locations in the projection image where the metal implant lies. This localization typically relies on knowledge that the metal components have a high attenuation coefficient. In effect, this is a relatively weak incorporation of prior knowledge.

In penalized-likelihood reconstruction schemes, general knowledge about the image can be included via Gibbs priors or penalty functions [K. Lange, "Convergence of EM image reconstruction algorithms with Gibbs smoothing," *IEEE Trans Med Imaging*, vol. 9, pp. 439-46, 1990; T. Hebert and R. Leahy, "A generalized EM algorithm for 3-D Bayesian reconstruction from Poisson data using Gibbs priors," *IEEE Trans Med Imaging*, vol. 8, pp. 194-202, 1989; J. B. Thibault, et al., "A three-dimensional statistical approach to improved image quality for multislice helical CT," *Med Phys*, vol. 34, pp. 4526-44, November 2007; J. Wang, et al., "Iterative image reconstruction for CBCT using edge-preserving prior," *Med Phys*, vol. 36, pp. 252-60, January 2009].

In more recent work, very specific image priors that incorporate prior scans of the anatomy have been used in algorithms like PICCS [G. H. Chen, et al., "Prior image constrained compressed sensing (PICCS): a method to accurately reconstruct dynamic CT images from highly undersampled projection data sets," *Med Phys*, vol. 35, pp. 660-3, February 2008] and modified penalized-likelihood approaches [J. Stayman, et al., "Penalized-likelihood reconstruction for sparse data acquisitions with unregistered prior images and compressed sensing penalties," in *SPIE Medical Imaging*, 2011]. However, these approaches still result in low imaging quality.

There is thus a need for improved processing of image data.

SUMMARY

An imaging system for processing image data of an object containing a component according to an embodiment of the current invention has an imaging device arranged to obtain image data and a processor. The processor is adapted to receive the image data from the imaging device, obtain a component model for the component, obtain an imaging device model for the imaging device, construct an unconstrained objective function based on the component model and the imaging device model, and construct a model of the object containing the component based on the unconstrained objective function and the image data, and a display device adapted to display an image for the object containing the component based on the model.

A method for processing image data for an object containing a component according to an embodiment of the current invention includes receiving the image data from an imaging device, obtaining a component model for the component, obtaining an imaging device model for the imaging device, constructing an unconstrained objective function based on the component model and the imaging device model, and constructing a model of the object containing the component based on the unconstrained objective function and the image data.

BRIEF DESCRIPTION OF THE DRAWINGS

Further objectives and advantages will become apparent from a consideration of the description, drawings, and examples.

DETAILED DESCRIPTION

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention. All references cited anywhere in this specification are incorporated by reference as if each had been individually incorporated.

Figure 1:
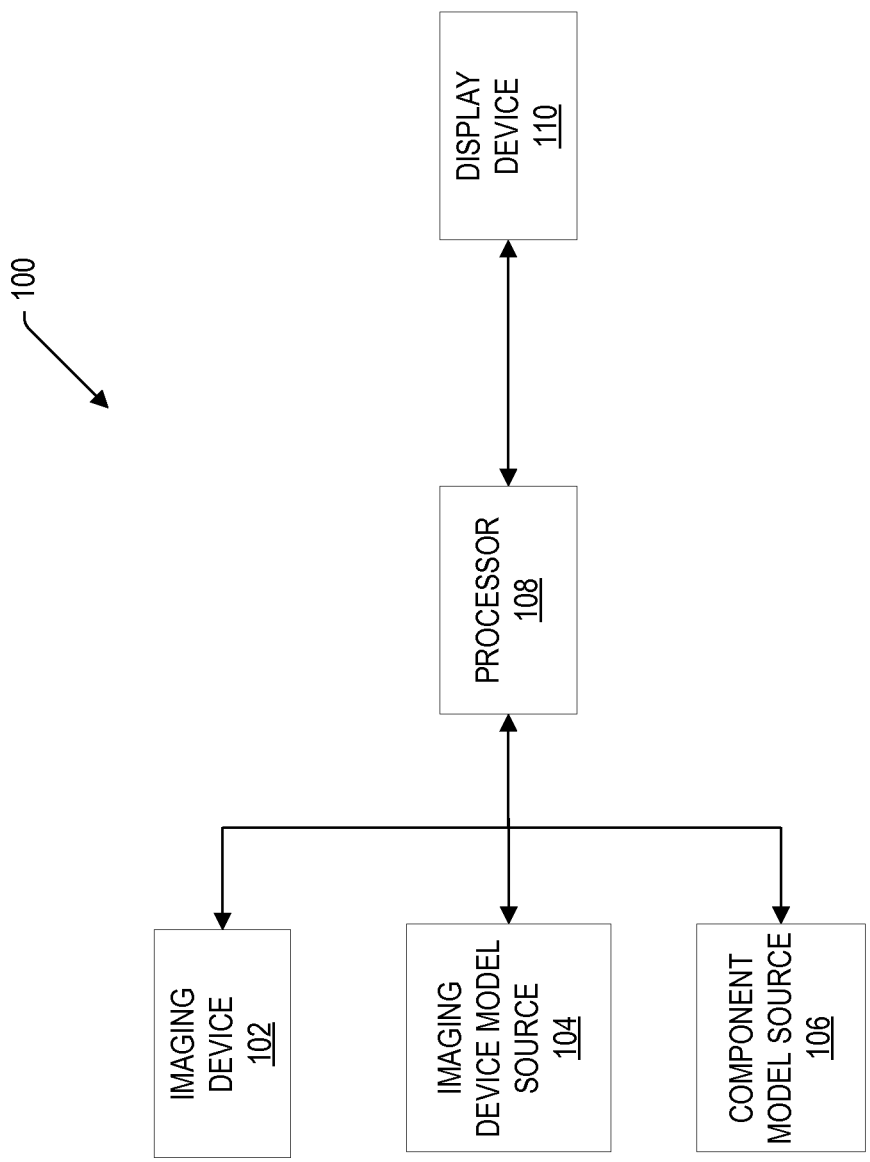
FIG. 1 illustrates a block diagram of a system according to an embodiment of the current invention.

FIG. 1 illustrates a block diagram of system 100 according to an embodiment of the current invention. System 100 may include imaging device 102, imaging device model source 104, component model source 106, processor 108, and display device 110.

Imaging device 102 may be a device adapted to obtain image data for an object. Image data may be data associated with different sectional images of the object. The different sectional images may be taken using x-rays projected at different focal planes. For example, imaging device 102 may be a computed tomography (CT) machine, the object imaged may be a person with a component inside the person, and the image data may be projection image data from the CT machine. A component may be any object, for example, a metal screw.

Imaging device model source 104 may be a source adapted to provide an imaging device model. The imaging device model may be a model of the imaging device which may be used to construct a model of an object containing the component based on image data for the object containing the component. The imaging device model may define characteristics for constructing the model of the object containing the component based on characteristics of imaging device 102. For example, the characteristics may indicate the model should be constructed taking into account which focal planes imaging device 102 obtains images at, the noise in images obtained by imaging device 102, etc. Imaging device model source 104 may be a device storing the imaging device model or a device which generates the imaging device model.

Component model source 106 may be a source adapted to provide a component model. The component model may be a model of the component. The component model may define parameterization characteristics and registration characteristics of the component. Parameterization characteristics may be characteristics which specify attenuation characteristics of the component. For example, parameterization characteristics may include attenuation coefficient, Hounsfield value, material composition, or material density. The parameterization characteristics may indicate that the component has a heterogeneous or a homogenous composition. Registration characteristics may be characteristics which specify the shape of the component and how the shape of the component may change if the component is deformable and allowable positions, orientations, etc. For example, the component model may be a computer assisted design (CAD) model that specifies the material composition and structure of the component which can be used to model the effect the component would have in image data. Component model source 106 may be a device storing the imaging device model or a device which generates the imaging device model.

Processor 108 may be a processing unit adapted to receive the image data from imaging device 102, obtain the imaging device model from imaging device model source 104, and obtain the component model from component model source 106. The processing unit may be a computing device, e.g., a computer. If the component is known to be in the field-of-view of an image associated with the image data, processor 108 may utilize the image data, the imaging device model, and the component model source to construct a model of the object containing the component. For example, if a screw, the component, is known to be inside a person whom is imaged, the object containing the component would be the person and the screw, and the processor 108 may utilize the component model for the screw to construct a model of the person including the screw.

Constructing a model of the object containing the component based on the image data, the imaging device model, and the component model source may result in increased image quality which may also allow for the acquisition of data with lower data fidelity. In constructing the model of the object containing the component, processor 108 may also calculate registration parameters for the component. Registration parameters may specify the location, orientation, and shape of the component. Processor 108 may also generate images of the object containing the component based on the model of the object containing the component.

Display device 110 may be a device adapted to receive the generated images from processor 108 and display the generated images. For example, display device 110 may be a liquid crystal display (LCD) device. Display device 110 may also receive registration parameters from processor 108 and display the registration parameters.

Imaging device 102, imaging device model source 104, component model source 106, processor 108, and display device 110 may be separate devices, a single integrated device, or a combination of separate devices and integrated devices. Imaging device 102, imaging device model source 104, component model source 106, processor 108, and display device 110 may be in communication via a network (e.g., an intranet or the Internet) or via circuitry within one or more integrated devices.

Figure 2:
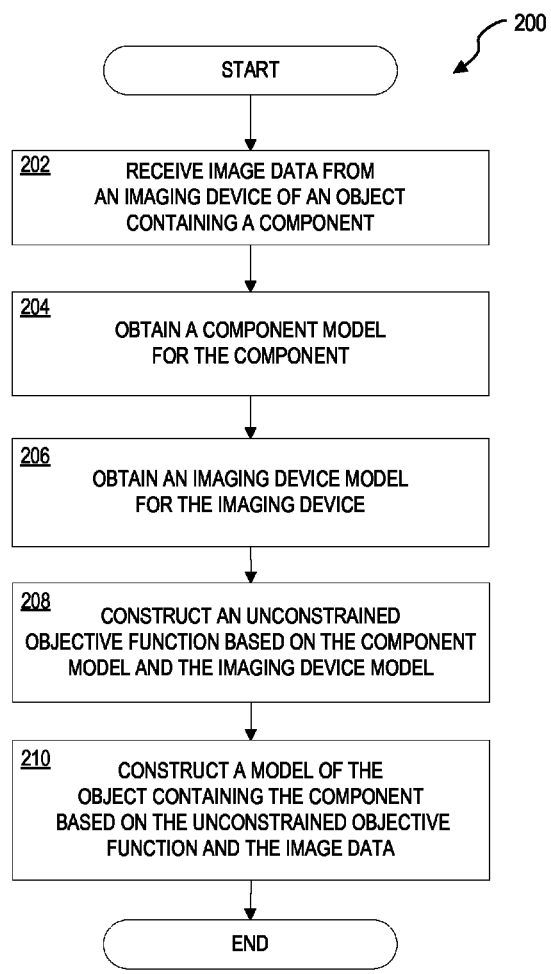
FIG. 2 illustrates an exemplary process flowchart for constructing a model of an object containing a component according to an embodiment of the current invention.

FIG. 2 illustrates exemplary process flowchart 200 for constructing a model of an object containing the component according to an embodiment of the current invention. Initially, processor 108 may receive image data from imaging device 102 for an object containing the component (block 202), obtain a component model for the component from component model source 106 (block 204), and obtain an imaging device model for imaging device 102 from imaging device model source 104 (block 206).

As discussed above, processor 108 may be separate from or integrated with one or more of imaging device model source 104 and component model source 106. In the case where processor 108 is separate, processor may obtain the relevant model via communicating over a network with the relevant source. In the case where processor 108 is integrated, processor may obtain the relevant model by functioning as the relevant source and generating the model.

Using the component model and the imaging device model, processor 108 may construct an unconstrained objective function based on the component model and the imaging device model (block 208). The unconstrained objective function may be derived from a likelihood function based on the imaging device model (including systemic noise) and the component model. The component model may be integrated into the object using a masking operation and addition, resulting in an unconstrained objective function. Specifically, the objective function may be unconstrained because the image parameters that specify the object background are free to take on any value in the optimization process.

Processor may also construct the unconstrained objective function based on one or more additional component models for one or more additional components known to be in a field of view of one or more images associated with the image data.

Using the unconstrained objective function, processor 108 may construct a model of the object containing the component based on the unconstrained objective function and the image data (block 210).

Figure 3:
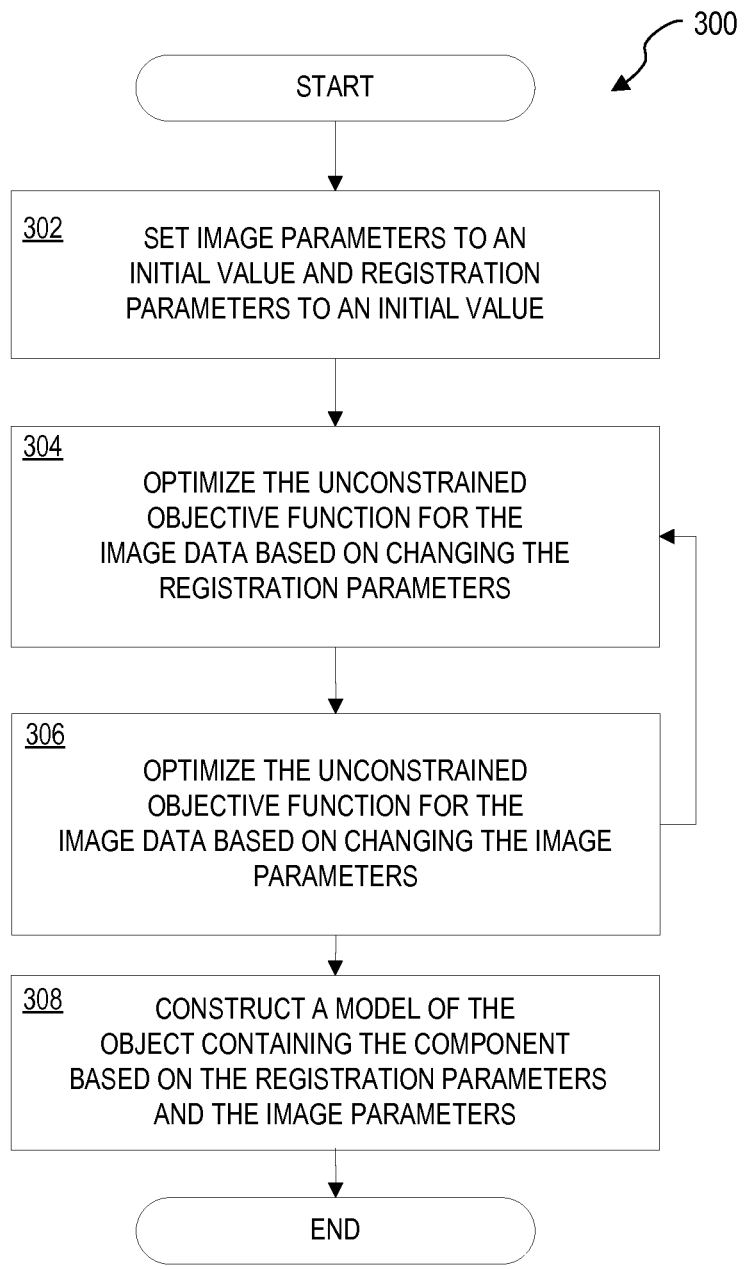
FIG. 3 illustrates an exemplary process flowchart for constructing a model of an object containing a component based on registration parameters and image parameters according to an embodiment of the current invention.

FIG. 3 illustrates exemplary process flowchart 300 for constructing a model of an object containing the component based on registration parameters and image parameters according to an embodiment of the current invention. FIG. 3 may illustrate a more detailed embodiment of how processor 108 may construct a model of the object containing the component based on the unconstrained objective function and the image data, as shown in block 210.

Processor 108 may set image parameters to an initial value and registration parameters to an initial value (block 302). For example, the initial value for the registration parameters may place the component in the center of the object aligned with the longest axis of the object. Image parameters may be parameters which specify parameterization characteristics of the object containing the component. For example, image parameters may specify background attenuation in an object containing the component. Registration parameters may specify a location and an orientation of the component.

Using the initial values, the unconstrained objective function may be optimized for the image data based on changing the registration parameters while holding the image parameters constant (block 304). For example, the estimated location of the component may be moved. If the unconstrained objective function increases, then the new location may be kept. If the unconstrained objective function decreases, then the estimated location of the component may be reverted to the previous location.

Using the initial values and the updated registration parameters, the unconstrained objective function may be optimized for the image data based on changing the image parameters while holding the optimized registration parameters constant (block 306). For example, the background attenuation of the image may be estimated based on changing the image parameters.

The optimization process between updating registration parameters and image parameters may be iteratively repeated as many times as desired.

Using the final registration parameters and image parameters, processor 108 may construct a model of the object containing the component (block 308). For example, processor 108 may use the final registration parameters to determine the location and orientation of the component and the final image parameters to determine the attenuation from portions of the image.

EXAMPLE

The likelihood of finding manufactured components (surgical tools, implants, etc.) within a tomographic field-of-view has been steadily increasing. One reason is the aging population and proliferation of prosthetic devices, such that more people undergoing diagnostic imaging have existing implants, particularly hip and knee implants. Another reason is that use of intraoperative imaging (e.g., cone-beam CT) for surgical guidance is increasing, wherein surgical tools and devices such as surgical screws and plates are placed within or near to the target anatomy. When these components contain metal, the reconstructed volumes are likely to contain severe artifacts that adversely affect the image quality in tissues both near and far from the component. Because physical models of such components exist, there is a unique opportunity to integrate this knowledge into the reconstruction algorithm in order to reduce these artifacts.

Described below is a model-based penalized-likelihood estimation approach that explicitly incorporates known information about component geometry and composition. The approach uses an alternating maximization method that jointly estimates the anatomy and the position and pose of each of the known components. It is demonstrated that the proposed method can produce nearly artifact-free images even near the boundary of a metal implant in simulated vertebral pedicle screw reconstructions even when there is substantial photon starvation. The simultaneous estimation of device pose also provides quantitative information on device placement that could be valuable to quality assurance and verification of treatment delivery.

The availability of physical models for surgical tools, fixation hardware, and implants allows for very specific prior knowledge to be incorporated into the reconstruction routine with the potential for additional benefit. Since such components represent manufactured objects, CAD models that completely specify their material composition and structure may be available. Described below is an algorithm that integrates such known physical models into the reconstruction process. Specifically, the model of the object volume itself is a combination of: 1) the volume of (unknown) background anatomy; and 2) the component (or components) known to be in the imaging field-of-view.

While the form and attenuation distributions of the components are known (e.g., derived from a CAD model that specifies the shape and material content of the device), the positions and poses are unknown. Thus, the parameters associated with each component registration also become part of the object model. The resulting reconstruction scheme has an objective that is a function of both image parameters and registration parameters, and these two sets of parameters are estimated jointly. This approach bears some similarity with other objective functions that seek joint image reconstruction and registration [J. A. Fessler, "Optimization transfer approach to joint registration/reconstruction for motion-compensated image reconstruction," presented at the ISBI, 2010; M. Jacobson and J. A. Fessler, "Joint estimation of image and deformation parameters in motion-corrected PET," in *Proc. IEEE Nuc. Sci. Symp. Med. Im. Conf*, 2003, pp. 3290-3294; S. Y. Chun and J. A. Fessler, "Joint image reconstruction and nonrigid motion estimation with a simple penalty that encourages local invertibility.," in *Proc. SPIE 7258, Medical Imaging 2009: Phys. Med. Im.,* 2009, p. 72580U].

Snyder, Murphy, et al. have developed a model-based approach for incorporating exact knowledge of a component through a constraint on an objective function [D. L. Snyder, et al., "Deblurring subject to nonnegativity constraints when known functions are present with application to object-constrained computerized tomography," *IEEE Trans Med Imaging,* vol. 20, pp. 1009-17, October 2001; R. J. Murphy, et al., "Pose estimation of known objects during transmission tomographic image reconstruction," *IEEE Trans Med Imaging,* vol. 25, pp. 1392-404, October 2006; J. F. Williamson, et al., "Prospects for quantitative computed tomography imaging in the presence of foreign metal bodies using statistical image reconstruction," *Med Phys*, vol. 29, pp. 2404-18, October 2002]. However, the approach outlined below, among other things, utilizes an unconstrained objective function and is generalized for an arbitrary number of known components whose poses are unknown.

The approach is outlined as follows. Section I describes a likelihood-based objective function and reconstruction algorithm that models the image volume as the combination of an arbitrary number of known components (with unknown poses) within the unknown background anatomy. Section II illustrates the performance of this method and compares the performance with traditional analytic and iterative approaches.

Section I: Methods

A. Forward Model

Consider the following measurement model for a transmission tomography system $$\bar{y}_i = b_i \exp(-l_i). \tag{1}$$

Mean projection measurements, $\bar{y}_i$, are related to line integrals through the object, $l_i$, via Beer's law. Each measurement has a scalar value, $b_i$, associated with the unattenuated x-ray fluence for the particular ray path and gain for the specific detector element. For a discretized object (e.g., using a voxel basis), the line integrals can be represented as $$l_i = \sum_{j=1}^{p} a_{ij} \mu_j, \tag{2}$$

where $a_{ij}$ represents the contribution of the $j^{th}$ voxel (or other basis), $\mu_j$, to the $i^{th}$ line integral. This model may be written compactly in a matrix-vector form such that $$\bar{y} = D\{b\}\exp(-A\mu), \tag{3}$$

where $D\{\bullet\}$ represents an operator that forms a diagonal matrix from the vector argument, and the system matrix, $A$, represents the collection of all $a_{ij}$. Ordinarily, (3) represents the complete relationship between the object and the measurements, and it is from (3) that an objective function is derived. It is chosen to further parameterize the object as the combination of an unknown anatomical background volume, $\mu^*$, and an arbitrary number of components, $\mu_I^{(n)}$, whose attenuation distributions are known. Mathematically, it can be written $$\mu = \left(\prod_{n=1}^{N} D\{W(\lambda^{(n)})s^{(n)}\}\right)\mu_* + \sum_{n=1}^{N} W(\lambda^{(n)})\mu_I^{(n)}, \tag{4}$$

where $W(\lambda)$ represents a transformation operator parameterized by the vector. While this transformation is general, this work focuses on three-dimensional (3D) rigid transformations. In this case, the vector $\lambda$, is comprised of the six elements (translation and rotation values) that define a component's orientation. The second term of (4) represents the summation of attenuation values for N known attenuation volumes, $\mu_I^{(n)}$, each having been (rigidly) transformed according to its own parameter vector, $\lambda^{(n)}$. The first term of (4) represents the contribution of the background anatomy, $\mu^*$, which has been modified by multiplication with a set of transformed masks, $s^{(n)}$, corresponding to each known component. Specifically, each mask represents a support region for each component. A typical mask is largely binary except for partial volume effects at the edges. The product operator, Π, used in (4) and throughout this paper represents an element-by-element product for matrix or vector operands.

B. Likelihood-Based Objective Function

Equations (3) and (4) represent the relationship between the mean measurements and the parameterized volume. Selection of a noise model allows for derivation of a likelihood function. It is chosen to invoke a Poisson model which yields the following log-likelihood $$L(\mu_*, \Lambda; y) = \sum_i [y]_i \log([\bar{y}(\mu_*, \Lambda)]_i) - [\bar{y}(\mu_*, \Lambda)]_i \quad (5)$$

$$= \sum_i y_i \log[b_i \exp(-l_i)] - b_i \exp(-l_i)$$

where the collection of the set of registration parameters for all N components is denoted as $$\Lambda = \{\lambda^{(n)}\}_{n=1}^N. \quad (6)$$

It is chosen to employ a penalized-likelihood estimator with the following implicit form $$\{\hat{\mu}_*, \hat{\Lambda}\} = \underset{\mu_*, \Lambda}{\mathrm{argmax}} \Phi(\mu_*, \Lambda; y) \quad (7)$$

$$= \underset{\mu_*, \Lambda}{\mathrm{argmax}} L(\mu_*, \Lambda; y) - \beta R(\mu_*),$$

where R(•) denotes a penalty function that discourages overly noisy images. The implicit estimator in (7) may be referred to as the "known-component reconstruction" (KCR) approach. This estimator jointly approximates both the anatomical background and the set of registration parameters associated with each known component. While the regularization term is general, a pairwise quadratic penalty may be used $$R(\mu_*) = \sum_j \sum_{k \in \mathcal{N}_j} ([\mu_*]_j - [\mu_*]_k)^2. \quad (8)$$

where $\mathcal{N}_j$ denotes a first-order neighborhood of voxels around voxel j.

C. Transformation Operator

The joint estimator in (7) requires the transformation operator, W, found in (4) to be specified. The formulation in (4) is general and the transformation could potentially represent warping operations or other forms of parameterized deformations. Similarly, W could represent component transformations that have constrained motions like pivots or hinge points. This example focuses on the case of rigid transformations.

Transformation operators associated with registration of a "moving" image to a "fixed" image can often be decomposed into two parts: 1) a mapping of gridded points in the moving image to the positions of those points in the transformed image; and 2) an interpolation operation that uses a neighborhood of voxels about each point in the moving image to generate a voxel value in the transformed image. For a 3D rigid transformation, the mapping of points from the moving image to the transformed image may be denoted as $$\begin{bmatrix} x'_j \\ y'_j \\ z'_j \end{bmatrix} = R_x(\theta) R_y(\psi) R_z(\phi) \left( \begin{bmatrix} x_j \\ y_j \\ z_j \end{bmatrix} - \begin{bmatrix} x_c \\ y_c \\ z_c \end{bmatrix} \right) + \begin{bmatrix} x_c - x_T \\ y_c - y_T \\ z_c - z_T \end{bmatrix}, \quad (9)$$

where $[x_j\ y_j\ z_j]^T$ represents a voxel location in the moving image, and $[x'_j\ y'_j\ z'_j]^T$ is the position in the transformed image. The vector $[x_c\ y_c\ z_c]^T$ is the location of the center of the image volume and $[x_T\ y_T\ z_T]^T$ are translation parameters. Rotation matrices about each axis are defined as follows $$R_x(\theta) = \begin{bmatrix} 1 & 0 & 0 \\ 0 & \cos\theta & \sin\theta \\ 0 & -\sin\theta & \cos\theta \end{bmatrix} \quad R_y(\psi) = \begin{bmatrix} \cos\psi & 0 & -\sin\psi \\ 0 & 1 & 0 \\ \sin\psi & 0 & \cos\psi \end{bmatrix} \quad (10)$$

$$R_z(\phi) = \begin{bmatrix} \cos\phi & \sin\phi & 0 \\ -\sin\phi & \cos\phi & 0 \\ 0 & 0 & 1 \end{bmatrix}$$

with θ, ψ, and φ denoting parameters for rotation about each axis. Thus, the six element parameter vector for transformation may be explicitly defined as $\lambda = [x_T\ y_T\ z_T\ \theta\ \psi\ \phi]^T$. While (9) denotes the mapping of the $j^{th}$ voxel position from $[x_j\ y_j\ z_j]^T$ to $[x'_j\ y'_j\ z'_j]^T$, it is recognized that the entire mapping is represented by the three "moving image" vectors x, y, and z, and the three "transformed image" vectors x', y', and z' that are collections of all grid points in the moving and transformed images.

With the point mapping defined, it remains to define the interpolation step. A kernel-based interpolation approach that is separable in each dimension may be considered.

Figure 4:
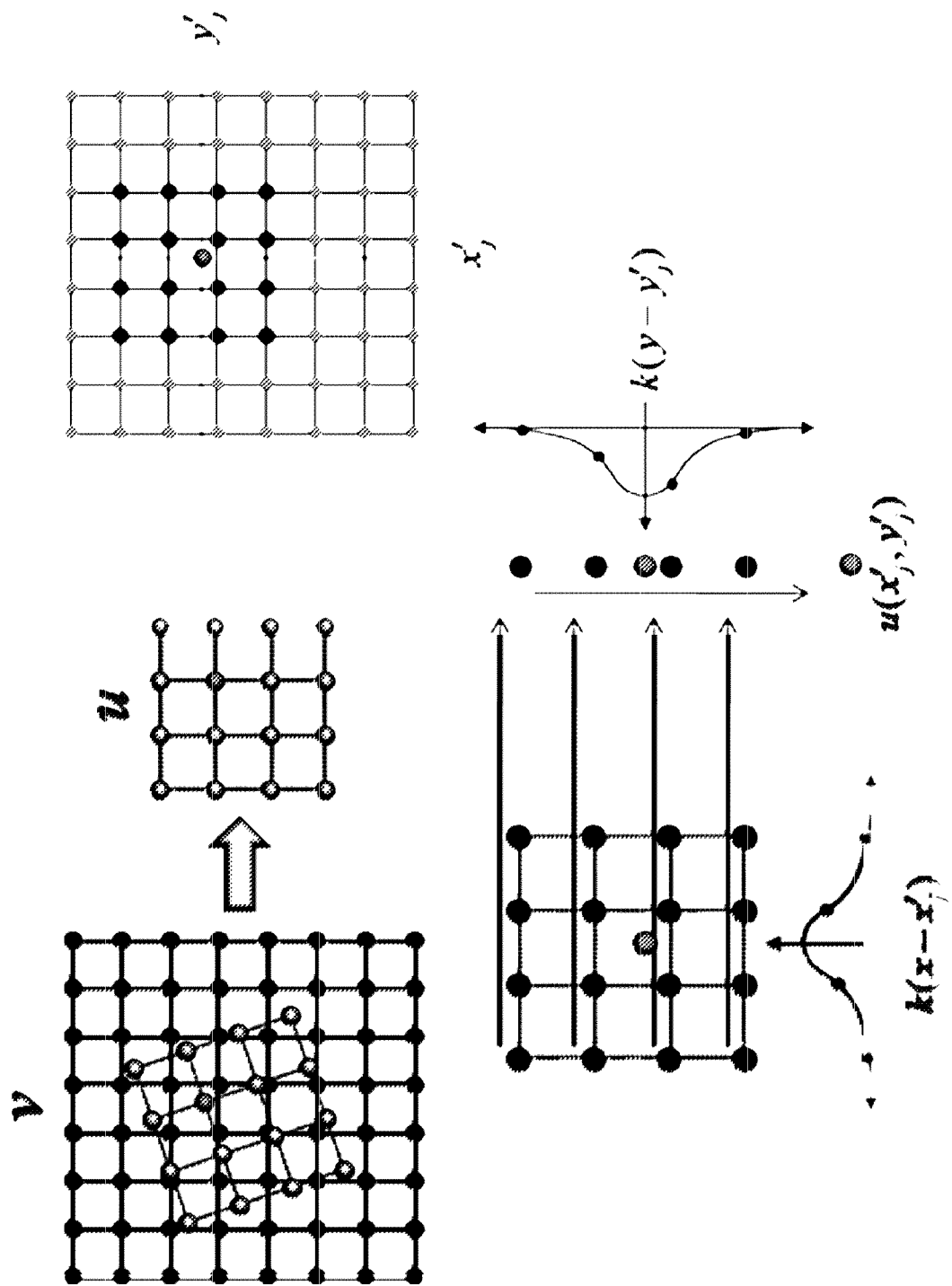
FIG. 4 illustrates an exemplary diagram of kernel-based interpolation in two dimensions according to an embodiment of the current invention.

FIG. 4 illustrates an exemplary diagram of kernel-based interpolation in two dimensions according to an embodiment of the current invention. The upper left shows mapping of a moving image (v) to a transformed image (u). The upper right shows a single transformed image point is computed based on a neighborhood of values in the moving image. The bottom shows kernels that are a function of the position in the transformed image are applied in succession along each dimension to yield the value in the transformed image at that point.

For each location, j, in the transformed image, a kernel is applied to a neighborhood of points in the moving image to approximate the value in the transformed image. One-dimensional (1D) kernels are applied successively along each dimension in the neighborhood and are summed, so that each pass reduces the dimension by one—for example, in 2D, two 1D kernels applied to get a single voxel value. In 3D, this operation is related back to the original transformation mathematically as $$u = W(\lambda)v = K_z(z') K_y(y') K_x(x') v, \quad (11)$$

where u and v are vectors denoting the transformed and moving images, respectively. The K operators represent the 1D kernel applications in each direction for all locations, and are a function of the particular point mapping. While there are many kernel choices, a B-spline kernel [P. Thevenaz, et al., "Interpolation revisited," *IEEE Trans Med Imaging*, vol. 19, pp. 739-58, July 2000] defined as follows is employed:

$$k(t) = \begin{cases} \frac{2}{3} - \frac{1}{2}|t|^2(2-|t|) & |t| < 1 \\ \frac{1}{6}(2-|t|)^3 & 1 \le |t| < 2 \\ 0 & \text{Otherwise} \end{cases} \quad (12)$$

This kernel has two particularly advantageous properties: 1) it preserves non-negativity in the transformed image (for nonnegative "moving" images) and thereby avoids negative attenuation coefficients from entering into the estimation; and 2) k(t) is differentiable and therefore allows for gradient-based methods in the optimization of the objective proposed in (7).

In the following section analytic gradient information is utilized to approximate solutions to (7). Since that gradient information necessarily includes derivatives of the transformation operator with respect to the parameters being estimated, those equations are derived here. Specifically, the derivative of the W operator with respect to elements of λ is derived. Using the chain rule, one may write $$\dot{W}_m(\lambda)v \triangleq \frac{\partial}{\partial \lambda_m} W(\lambda)v = D\left\{\frac{\partial}{\partial \lambda_m} z'\right\} \dot{K}_z(z') K_y(y') K_x(x')v + \quad (13)$$

$$D\left\{\frac{\partial}{\partial \lambda_m} y'\right\} K_z(z') \dot{K}_y(y') K_x(x')v +$$

$$D\left\{\frac{\partial}{\partial \lambda_m} x'\right\} K_z(z') K_y(y') \dot{K}_x(x')v,$$

where the derivative transformation operator with respect to the $m^{th}$ element of λ is denoted as $\dot{w}_m(\lambda)v$. The $\dot{K}$ operators are similar to the original kernel operators except that they apply the derivative kernel. For the B-spline kernel in (12), the derivative kernel may be computed as $$\dot{k}(t) = \begin{cases} \frac{1}{2}\mathrm{sgn}(t)|t|^2 - t(2 - |t|) & |t| < 1 \\ -\frac{1}{2}\mathrm{sgn}(t)(2 - |t|)^2 & 1 \leq |t| < 2 \\ 0 & \text{Otherwise} \end{cases} \quad (14)$$

The remaining partial derivatives in (13) may be computed by differentiating (9) with respect to $\lambda_m$. Specifically $$\frac{\partial x'_j}{\partial x_T} = -1, \frac{\partial x'_j}{\partial y_T} = 0, \frac{\partial x'_j}{\partial z_T} = 0, \frac{\partial y'_j}{\partial x_T} = 0, \frac{\partial y'_j}{\partial y_T} = -1, \quad (15)$$

$$\frac{\partial y'_j}{\partial z_T} = 0, \frac{\partial z'_j}{\partial x_T} = 0, \frac{\partial z'_j}{\partial y_T} = 0, \frac{\partial z'_j}{\partial z_T} = -1,$$

$$\begin{bmatrix} \frac{\partial x'_j}{\partial \theta} \\ \frac{\partial y'_j}{\partial \theta} \\ \frac{\partial z'_j}{\partial \theta} \end{bmatrix} = \dot{R}_x(\theta) R_y(\psi) R_z(\phi) \left( \begin{bmatrix} x_j \\ y_j \\ z_j \end{bmatrix} - \begin{bmatrix} x_c \\ y_c \\ z_c \end{bmatrix} \right) \quad (16)$$

$$\begin{bmatrix} \frac{\partial x'_j}{\partial \psi} \\ \frac{\partial y'_j}{\partial \psi} \\ \frac{\partial z'_j}{\partial \psi} \end{bmatrix} = R_x(\theta) \dot{R}_y(\psi) R_z(\phi) \left( \begin{bmatrix} x_j \\ y_j \\ z_j \end{bmatrix} - \begin{bmatrix} x_c \\ y_c \\ z_c \end{bmatrix} \right)$$

$$\begin{bmatrix} \frac{\partial x'_j}{\partial \phi} \\ \frac{\partial y'_j}{\partial \phi} \\ \frac{\partial z'_j}{\partial \phi} \end{bmatrix} = R_x(\theta) R_y(\psi) \dot{R}_z(\phi) \left( \begin{bmatrix} x_j \\ y_j \\ z_j \end{bmatrix} - \begin{bmatrix} x_c \\ y_c \\ z_c \end{bmatrix} \right)$$

where $\dot{R}_x(\bullet)$, $\dot{R}_y(\bullet)$, and $\dot{R}_z(\bullet)$ represent the element-by-element derivatives of the rotation matrices specified in (10).

D. Optimization Approach

The previous subsections describe the forward model and all of the elements included in the estimator specified in (7). Since this estimator is the implicit maximizer of an objective function, an optimization algorithm may be adopted to iteratively approximate a solution. From the development in the previous section, it is noted that the objective function is differentiable and one may find the analytic expressions for the derivatives with respect to all of the estimation parameters:

$$\nabla_\mu L(\mu_*, \Lambda; y) = \left(\prod_{n=1}^{N} D\{W(\lambda^{(n)})s^{(n)}\}\right) A^T[D\{b\}\exp(-l) - y] \quad (17)$$

$$\frac{\partial}{\partial \lambda_m^{(n)}} L(\mu_*, \Lambda; y) = \quad (18)$$

$$\begin{bmatrix} D\{\mu_*\}D\left\{\prod_{k \neq n} W(\lambda^{(k)})s^{(k)}\right\}\dot{W}_m(\lambda^{(n)})s^{(n)} + \\ \dot{W}_m(\lambda^{(n)})\mu_l^{(n)} \end{bmatrix}^T \cdot A^T[D\{b\}\exp(-l) - y].$$

Given the analytic gradient of the objective function it would be straightforward to use almost any gradient-based algorithm to jointly solve for the parameters, $\hat{\mu}$ and $\hat{\Lambda}$; however, this would ignore years of development of specialized algorithms customized for tomographic reconstruction. Thus, it is proposed to use an alternating minimization approach where the image volume parameters, μ*, are updated using a tomography-specific image update, and the registration parameters, Λ, are updated using a traditional gradient-based approach.

Since Λ is relatively small with only 6N elements (for rigidly transformed components), it is practical to use a quasi-Newton update approach using the Broyden-Fletcher-Goldfarb-Shanno (BFGS) updates [D. G. Luenberger, *Linear and nonlinear programming*, 3rd ed. New York: Springer, 2007]. (If N is large, one might resort to a limited-memory variant [D. C. Liu and J. Nocedal, "On the Limited Memory BFGS Method for Large-Scale Optimization," *Mathematical Programming*, vol. 45, pp. 503-528, December 1989]) Such an approach that includes a bracketing line search is adopted.

For image updates, it may be choose to use updates based on a paraboloidal surrogates approach. The original derivations by Erdogan and Fessler [H. Erdogan and J. A. Fessler, "Monotonic algorithms for transmission tomography," *IEEE Trans Med Imaging*, vol. 18, pp. 801-14, September 1999] express (5) as the summation of marginal log-likelihoods, $h_i(l_i)$, such that $$L(\mu, \Lambda; y) = \sum_i h_i(l_i) \quad (19)$$

$$h_i(l_i) = y_i \log[b_i \exp(-l_i)] - b_i \exp(-l_i).$$

The following definitions may be made $$g_i(t_i) \Box h_i(t_i + d_i) = h_i(l_i) \quad (20)$$

$$t_i \Box B\mu_* = A\left(\prod_{n=1}^{N} D\{W(\lambda^{(n)})s^{(n)}\}\right)\mu_*$$

$$d_i \Box A\left(\sum_{n=1}^{N} W(\lambda^{(n)})\mu_I^{(n)}\right)$$

and note that $t_i \geq 0$ and $d_i \geq 0$ since A represents a projection operator with nonnegative elements, since W was chosen to use B-spline approximation which preserves normegativity, and because $s^{(n)}$, $\mu^*$, and $\mu_I^{(n)}$ are also nonnegative. (The matrix B represents a kind of modified system matrix.) Because $t_i \geq 0$ and $l_i = t_i + d_i \geq 0$, the function $g_i(t_i)$ satisfies the conditions of Theorem 1 in [H. Erdogan and J. A. Fessler, "Monotonic algorithms for transmission tomography," *IEEE Trans Med Imaging*, vol. 18, pp. 801-14, September 1999] and a paraboloidal surrogate for $g_i(t_i)$ with optimal curvature may be written as $$q_i(t; t_i^{[k]}) = g_i(t_i^{[k]}) + \dot{g}_i(t_i^{[k]})(t - t_i^{[k]}) - \frac{1}{2}c_i^{[k]}(t - t_i^{[k]})^2 \quad (21)$$

$$c_i^{[k]}(t_i^{[k]}) = \begin{cases} \left[-2\frac{g_i(0) - g_i(t_i^{[k]}) + \dot{g}_i(t_i^{[k]})t_i^{[k]}}{(t_i^{[k]})^2}\right]_+, & t_i^{[k]} > 0 \\ [-\ddot{g}_i(t_i^{[k]})]_+, & t_i^{[k]} = 0 \end{cases}$$

where the superscript [k] will denote the value at the $k^{th}$ iteration, $c_i$ denotes the curvature of the paraboloidal surrogate, and $[\bullet]_+$ denotes a function to ensure normegativity (truncation at zero). The first and second derivatives of g, denoted $\dot{g}$ and $\ddot{g}$, respectively, are straightforward to compute from (19) and (20). While the surrogates in (21) may be used to form an overall surrogate for the log-likelihood, the convexity trick of De Pierro [A. R. De Pierro, "On the relation between the ISRA and the EM algorithm for positron emission tomography," *IEEE Trans Med Imaging*, vol. 12, pp. 328-33, 1993] that was also used in [H. Erdogan and J. A. Fessler, "Ordered subsets algorithms for transmission tomography," *Phys Med Biol*, vol. 44, pp. 2835-51, November 1999] is applied, $$q_i([B\mu_*]_i; t_i^{[k]}) = q_i\left(\sum_i \alpha_{ij}\left[\frac{b_{ij}}{\alpha_{ij}}(\mu_{*j} - \mu_{*j}^{[k]}) + t_i^{[k]}\right]; t_i^{[k]}\right) \quad (22)$$

$$\geq \sum_i \alpha_{ij} q_i\left(\frac{b_{ij}}{\alpha_{ij}}(\mu_{*j} - \mu_{*j}^{[k]}) + t_i^{[k]}; t_i^{[k]}\right)$$

to obtain separable surrogates $$Q_j(\mu_{*j}; \mu_*^{[k]}) \Box \sum_i \alpha_{ij} q_i\left(\frac{b_{ij}}{\alpha_{ij}}(\mu_{*j} - \mu_{*j}^{[k]}) + t_i^{[k]}; t_i^{[k]}\right) \quad (23)$$

$$L(\mu_*, \Lambda; y) \geq \sum_j Q_j(\mu_{*j}; \mu_*^{[k]}),$$

where $\alpha_{ij} = b_{ij}/\Sigma_k b_{ik}$ may be chosen. Thus, for an unregularized objective, the following updates may be applied $$\mu_{*j}^{[k+1]} = \underset{\mu_{*j} \geq 0}{\operatorname{argmax}} Q_j(\mu_{*j}; \mu_*^{[k]}) \quad (24)$$

$$= \left[\mu_{*j}^{[k]} + \frac{\sum_i b_{ij} \dot{g}_i^{[k]}(t_i^{[k]})}{\sum_i b_{ij}\left(\sum_j b_{ij}\right)c_i^{[k]}(t_i^{[k]})}\right]_+$$

It is straightforward to modify these updates using the techniques in [H. Erdogan and J. A. Fessler, "Ordered subsets algorithms for transmission tomography," *Phys Med Biol*, vol. 44, pp. 2835-51, November 1999] to include various penalty functions, to adopt an ordered-subsets subiterations for improved convergence rates, or to use precomputed curvatures for decreasing the computational load.

E. Implementation

To investigate the approach derived above, all routines may be implemented in Matlab (The Mathworks, Inc., Natick Mass.) with calls to custom external libraries for the more computationally intensive aspects of the KCR methodology. Specifically, both matched Siddon [R. L. Siddon, "Fast calculation of the exact radiological path for a three-dimensional CT array," *Med Phys*, vol. 12, pp. 252-5, March-April 1985] and separable-footprint [Y. Long, et al., "3D forward and back-projection for X-ray CT using separable footprints," *IEEE Trans Med Imaging*, vol. 29, pp. 1839-50, November 2010] projectors and backprojectors may be implemented in C/C++ using CUDA libraries for execution on GPU. The same approach may be taken for 3D kernel-based interpolation via GPU.

Pseudocode for the entire alternating maximization approach for KCR is shown in Table 1. The code consists of two separate blocks: the first containing the registration parameter updates and the second containing the ordered-subsets-based volume updates. In this pseudocode, a generalized iteration superscript, [k, p, m], is used to indicate the main iteration number, k, the registration block subiteration number, p, and the image update block subiteration number, m. The symbol [•] is used for values not dependent on a particular index.

Table 1 illustrates a few free parameter choices for the algorithm—namely, the number of registration subiterations, P, the number of ordered-subsets, M, and the overall number of iterations. The scaling factor, σ, is used in the guess for the initial inverse Hessian estimate, $H^{[0,0,\bullet]}$, and needs to be chosen empirically based on the scale of the objective function, or via an initial line search to find the rough scale for an appropriate step size. Other salient features of this optimization include the reuse of H between main loop iterations and the inclusion of regularization in the image update using the first and second derivatives of the quadratic roughness penalty (indicated by $\dot{R}$ and $\ddot{R}$, respectively).

TABLE I

Outline of the alternating maximization used by the KCR Algorithm $\mu_*^{[0,\bullet,0]}$ = Initial reconstruction (FBP)
$\Lambda^{[0,0,\bullet]}$ = Initial guess for registration parameters
$H^{[0,0,\bullet]}$ = σI, initial guess for inverse Hessian
for k = 0 to max_iterations-1,
  % Registration Update Block
  for r = 1 to P (number of registration updates)
    Compute $\nabla_\Lambda L(\mu_*^{[k,\bullet,0]}, \Lambda^{[k,p-1,\bullet]})$
    $H^{[k,p,\bullet]}$ = BFGS update using new gradient TABLE I-continued Outline of the alternating maximization used by the KCR Algorithm $\hat{\gamma}$ = line search in $\Lambda^{[k,p-1,\cdot]} + \gamma H^{[k,p,\cdot]} \nabla_\Lambda L(\mu_*^{[k,\cdot,0]}, \Lambda^{[k,p-1,\cdot]})$
$\Lambda^{[k,p,\cdot]} = \Lambda^{[k,p-1,\cdot]} + \hat{\gamma} H^{[k,p,\cdot]} \nabla_\Lambda L(\mu_*^{[k,\cdot,0]}, \Lambda^{[k,p-1,\cdot]})$
end
Compute $d_j^{[k,P,\cdot]}(\Lambda^{[k,P,\cdot]})$
% Image Update Block
for m = 1 to M (number of subsets)
 Compute curvatures, $c_i^{[k,\cdot,m]}(\mu_*^{[k,\cdot,m-1]}, \Lambda^{[k,P,\cdot]})$
 Compute modified line integrals, $t_i^{[k,\cdot,m]}(\mu_*^{[k,\cdot,m-1]}, \Lambda^{[k,P,\cdot]})$ $$\mu_{*j}^{[k,\cdot,m]} = \left[\mu_{*j}^{[k,\cdot,m-1]} + \frac{M\sum_{i\in\Omega_m} b_{ij}\dot{g}_i(t_i^{[k,\cdot,m-1]}; d_i^{[k,P,\cdot]}) - \beta\dot{R}_j(\mu_*^{[k,\cdot,m-1]})}{M\sum_{i\in\Omega_m} b_{ij}\left(\sum_j b_{ij}\right)c_i^{[k,\cdot,m-1]} + \beta\ddot{R}_j(\mu_*^{[k,\cdot,m-1]})}\right]_+$$

end
$\mu_*^{[k+1,\cdot,0]} = \mu_*^{[k,\cdot,m]}$, $\Lambda^{[k+1,0,\cdot]} = \Lambda^{[k,P,\cdot]}$, $H^{[k+1,0,\cdot]} = H^{[k,P,\cdot]}$
end In the case where M=1, image updates should monotonically converge to a local maximum, and when a line search that satisfies the Wolfe conditions is used, the registration updates should monotonically converge to a local maximum. Therefore, under these conditions, convergence of the entire algorithm to a local maximum is also expected. When M>1 true convergence is not expected, just as ordinary ordered-subsets approaches do not strictly converge. Other algorithmic permutations are possible, including pre-computation of curvatures outside the main loop and mixing registration updates between individual ordered-subsets image updates.

Section II: Results

A. Simulation Studies

To investigate the performance of the KCR approach, a number of studies using a simulated cone-beam computed tomography (CBCT) system were conducted. This work focused on the task of imaging for guidance of pedicle screw placement in spine surgery [J. H. Siewerdsen, et al., "Volume CT with a flat-panel detector on a mobile, isocentric C-arm: Pre-clinical investigation in guidance of minimally invasive surgery," Medical Physics, vol. 32, pp. 241-254, January 2005].

Figure 5:
FIG. 5 illustrates exemplary models of a screw and a background volume according to an embodiment of the current invention.

FIG. 5 illustrates exemplary models of a screw and a background volume according to an embodiment of the current invention. (A) shows a CAD model for a polyaxial pedicle screw. The model consists of two main components: a pivoting head and a threaded screw. For the anatomical background volume, a digital phantom derived from a high-quality conventional CT scan of the lumbar region of a custom RANDO phantom (The Phantom Laboratory, Inc.) is used. Multiplanar slices of this phantom are shown in FIG. 5. (B) shows an axial slice, (C) shows a sagittal slice, and (D) shows a coronal slice.

For all of the investigations, an image volume of 300×300×128 voxels (1 mm cubes) is considered. The pedicle screw was similarly voxelized and placed into the image volume using the object model in (4). Note that (4) additionally requires voxelized component masks, $s^{(n)}$, that were also derived from the CAD model. The pedicle screw was assumed to be homogeneous titanium with a linear attenuation coefficient of 0.3 $mm^{-1}$. For comparison, the soft tissue background in the digital phantom was 0.02 $mm^{-1}$. The system geometry was chosen to emulate a flat-panel-based C-arm system with a source-to-detector distance of 1200 mm and source-to-axis distance of 600 mm [S. Schafer, et al., "Mobile C-arm cone-beam CT for guidance of spine surgery: Image quality, radiation dose, and integration with interventional guidance," Medical Physics, vol. 38, pp. 4563-4574, August 2011]. Projections were 360×150 pixels at (1.552×1.552) $mm^2$ pitch simulated over 360° using 360 angles. Simulated data were generated using a monoenergetic forward model and Poisson noise. Exposure levels were fixed at a uniform $10^4$ photons per detector element for an unattenuated beam. As demonstrated in the following sections, this exposure level leads to significant photon starvation artifacts for traditional approaches.

Three separate screw placement scenarios were investigated: 1) A unilateral monolithic (single component) pedicle screw; 2) bilateral monolithic screws; and 3) a unilateral two-component polyaxial screw. The registration parameters, A, were chosen to simulate proper placement of the screw (or screws) in one of the lumbar vertebra.

B. Convergence Properties

To investigate the convergence properties of the KCR approach, simulated data from the unilateral single-component screw placement scenario mentioned above was reconstructed. The initial guess for the background anatomy was a filtered-backprojection (FBP) image truncated at an upper attenuation of 0.03 $mm^{-1}$ (in a coarse attempt to remove the pedicle screw from the anatomy, since the screw should not be present in the background volume, $\mu^*$). A number of initial guesses were attempted for the registration parameters. For initial guesses sufficiently far from the solution, "capture issues" were observed in which the screw position estimate was lost in a local maximum (most often leaving the reconstructed field-of-view entirely so that the problem reduces to a traditional penalized-likelihood estimate). However, it was found that initialization for which there was at least modest overlap of the components with the true location in the projection data, the approach converged toward the true pose (except for errors due to noise). For initial guesses inside the capture range, residual errors in the pose estimate were consistently within one voxel (for translation parameters) and less than 0.5 degrees (in the rotation parameters) for the $10^4$ photons noise level.

Figure 6:
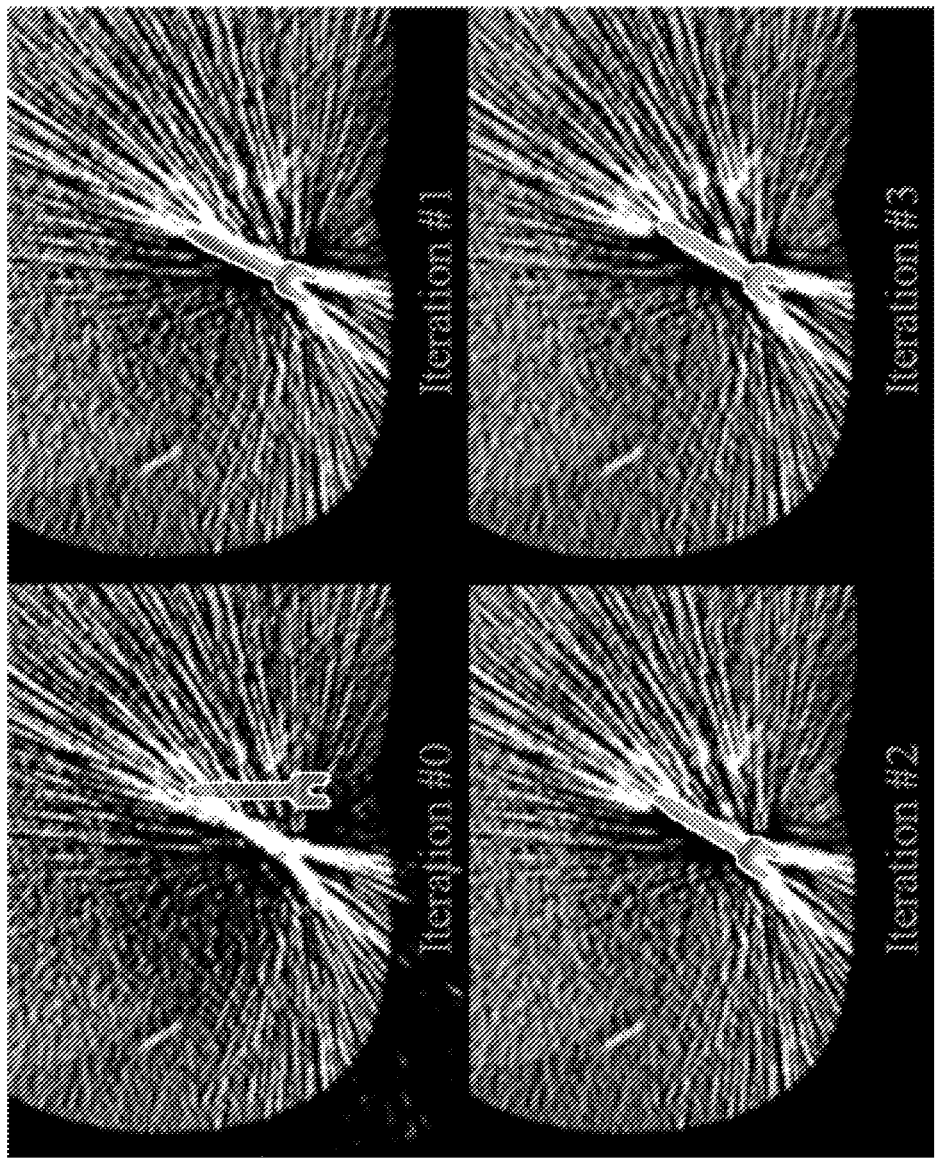
FIG. 6 illustrates an exemplary sequence of estimated axial slices and implant poses according to an embodiment of the current invention.

FIG. 6 illustrates an exemplary sequence of estimated axial slices and implant poses according to an embodiment of the current invention. The figure shows sample iterations starting with the initial guess and showing the first four iterations using P=10 and M=60, for registration and image subiterations, respectively. In the initial guess, the component may be arbitrarily placed. Note that the joint nature of the algorithm is evident, with refinements in both the pose of the component and reduction of streak artifacts in the background image between outer loop iterations. As shown in the figure, registration updates and image updates may be simultaneously performed between successive iterations.

Figure 7:
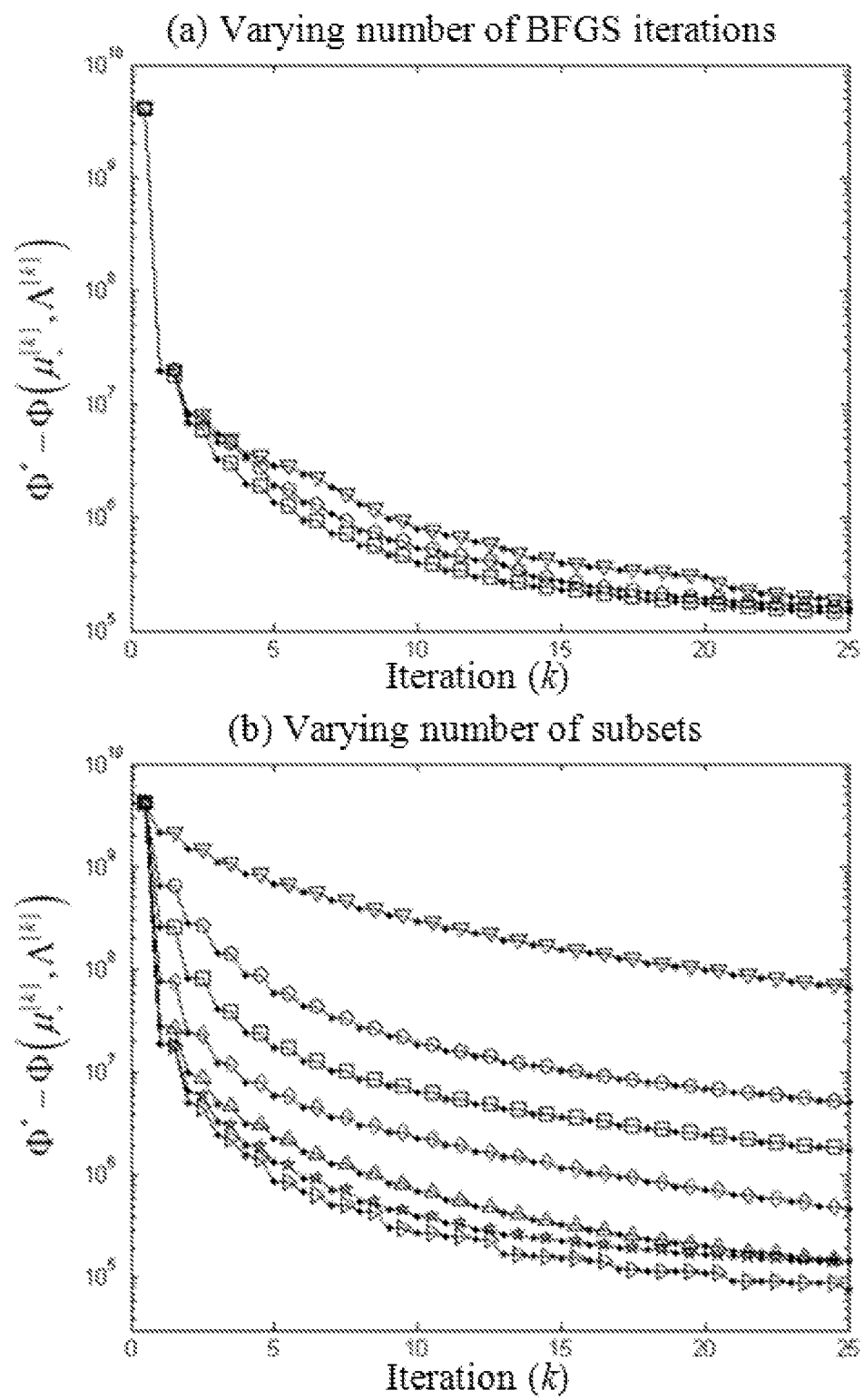
FIG. 7 illustrates exemplary convergence plots according to an embodiment of the current invention.

FIG. 7 illustrates exemplary convergence plots according to an embodiment of the current invention. FIG. 7(a) shows convergence plots for KCR using alternating applications of image updates using 60 subsets and registration updates using 4 (∇), 6 (○), and 10 (□), BFGS iterations. FIG. 7(b) shows convergence plots for alternating updates of 10 BFGS iterations and ordered subsets based image updates using 1 (∇), 5 (○), 10 (□), 20 (◇), 40 (Δ), and 60 (☆) subsets, as well as an approach that uses a dynamic number of subsets (▷). Objective function differences are plotted after both the registration block (identifying symbol) and after the image update (•).

To better understand the relative effects of different choices of numbers of subiterations, the convergence plots in FIG. 7 were computed. The two sets of plots represent the convergence rates for a varying number of registration updates for a fixed number of ordered-subset updates, and vice versa. Specifically, the difference between the objective function at the $k^{th}$ iteration and that at the solution, $\Phi^*$ (where the latter value was approximated using 100 iterations of KCR with P=10, and a dynamic number of subsets, as fully described below) were plotted.

FIG. 7(a) shows the first 25 iterations for three approaches using 4, 6, and 10 registration updates with 60 subsets. Objective function differences are shown after both the registration update (halfway between integer k values) and the image update (indicated with the • symbol). It is noted that the convergence rate appears to increase with additional BFGS updates; however, increasing the number above P=10 produced virtually the same convergence plots and suggested little to be gained from further emphasis on the registration updates. It was also found that the image updates lead to a greater objective function increase than the registration updates.

In FIG. 7(b), the number of registration updates was fixed at P=10, and M was varied across 1, 5, 10, 20, 40, and 60 subsets. In these cases, the convergence rate had a strong dependence on the number of subsets (with performance akin to traditional ordered-subset approaches). While all methods appeared to increase the objective monotonically, a plateau beyond M=60, which is expected since ordered-subsets are not strictly convergent, is noted. To avoid this plateau and maintain the excellent convergence rate, an approach is implemented in which the number of subsets is changed dynamically. Specifically, 120 subsets are started with and the number of subsets is reduced every four outer iterations through the sequence 90, 60, 40, 30, 20, 10, 3, 2, and 1. This method is represented in the lowest plot in FIG. 7(b). Since the dynamic subsets approach eventually uses a single subset, true convergence is expected with this method. Note the stepwise improvements in function value every four iterations when the number of subsets is changed.

C. Image Quality Experiments

For image quality experiments, all three pedicle screw implant scenarios and three different reconstruction methods are considered. Specifically, 200 iterations of the KCR approach with P=10 and the dynamic subsets approach (with M decreasing through the aforementioned sequence every 20 iterations) is applied. For comparison, the data is also reconstructed using a FBP approach and a traditional penalized-likelihood (PL) estimator. For FBP processing, the data was pre-processed by thresholding the data slightly above zero (to eliminate zero count measurements) prior to log-transformation. (An alternate approach, not shown here, that interpolated over these zero values using a median filter was also applied with qualitatively nearly the same results.)

Both the PL approach and KCR used a quadratic penalty with the same value of regularization parameter ($\beta$). Since the objectives are very similar, these two approaches produce images with similar resolution properties when the parameter is matched. It is noted that resolution properties for penalized-likelihood approaches (including KCR) are generally space-variant and object-dependent making exact resolution matches difficult. Therefore $\beta$ is selected to qualitatively match the spatial resolution of the FBP images.

Figure 8:
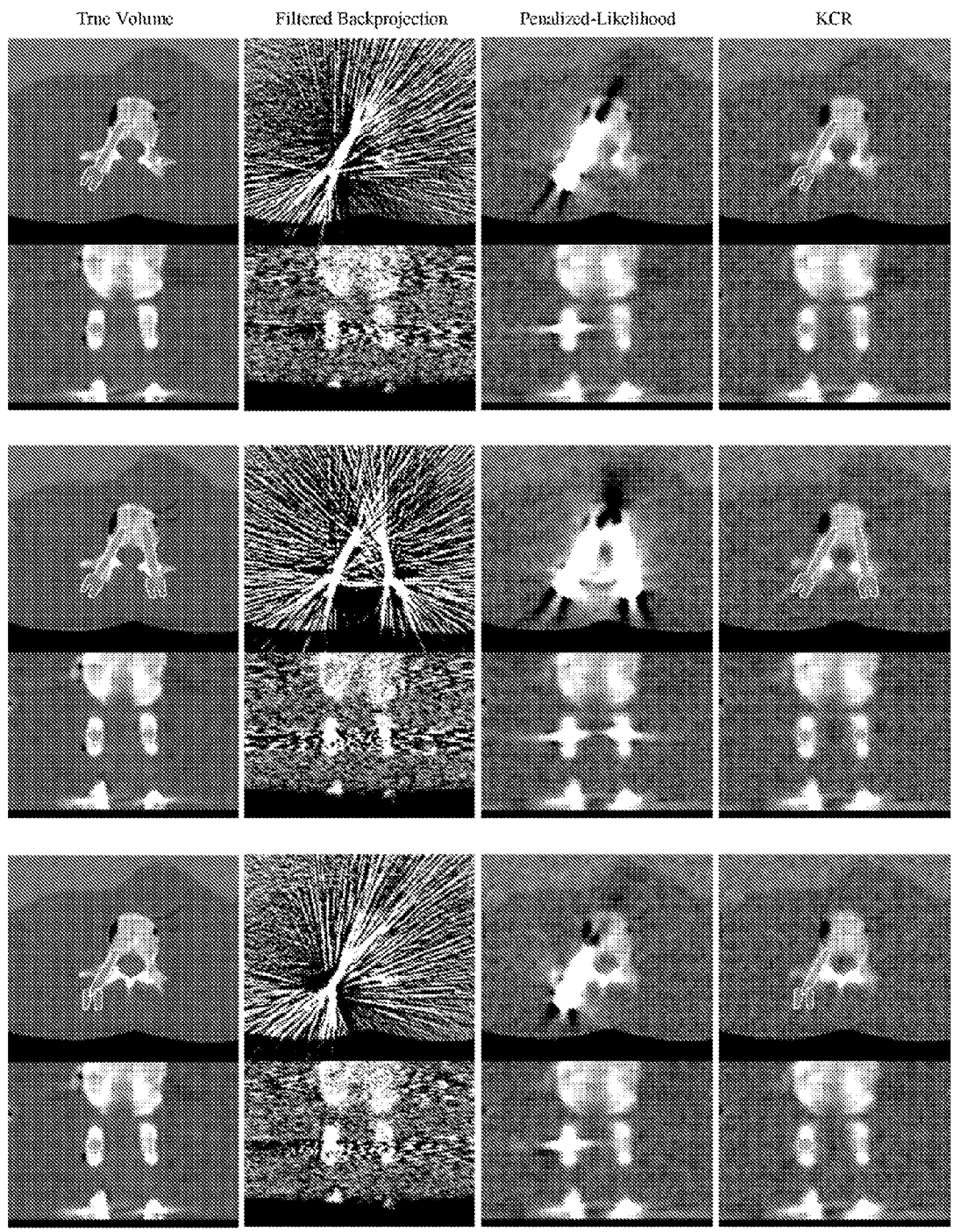
FIG. 8 illustrates an exemplary comparison of axial and coronal images of a screw and background volume based on different estimations according to an embodiment of the current invention.

FIG. 8 illustrates an exemplary comparison of axial and coronal images of a screw and background volume based on different estimations according to an embodiment of the current invention. FIG. 8 illustrates the image quality of KCR compared to FBP and traditional PL estimation. Axial and coronal images are presented for each method and each pedicle screw implant scenario: Top) Unilateral single-component screw; Middle) Bilateral single-component screws; Bottom) Unilateral two-component polyaxial screw. The window and level for all images is 500 and 150 HU, respectively. The overlay in the true image (left) shows the true pose of the component(s), whereas that in the KCR reconstruction (right) shows the pose as estimated by the simultaneous registration and reconstruction process.

The results are presented in FIG. 8 with the true digital phantom volume shown in the left column. As before, the position of components is indicated using an overlay. Such overlays are seen in the true volume images and the KCR images (but not in FBP or traditional PL, since those methods only include an image model and do not include a component registration model).

Figure 9:
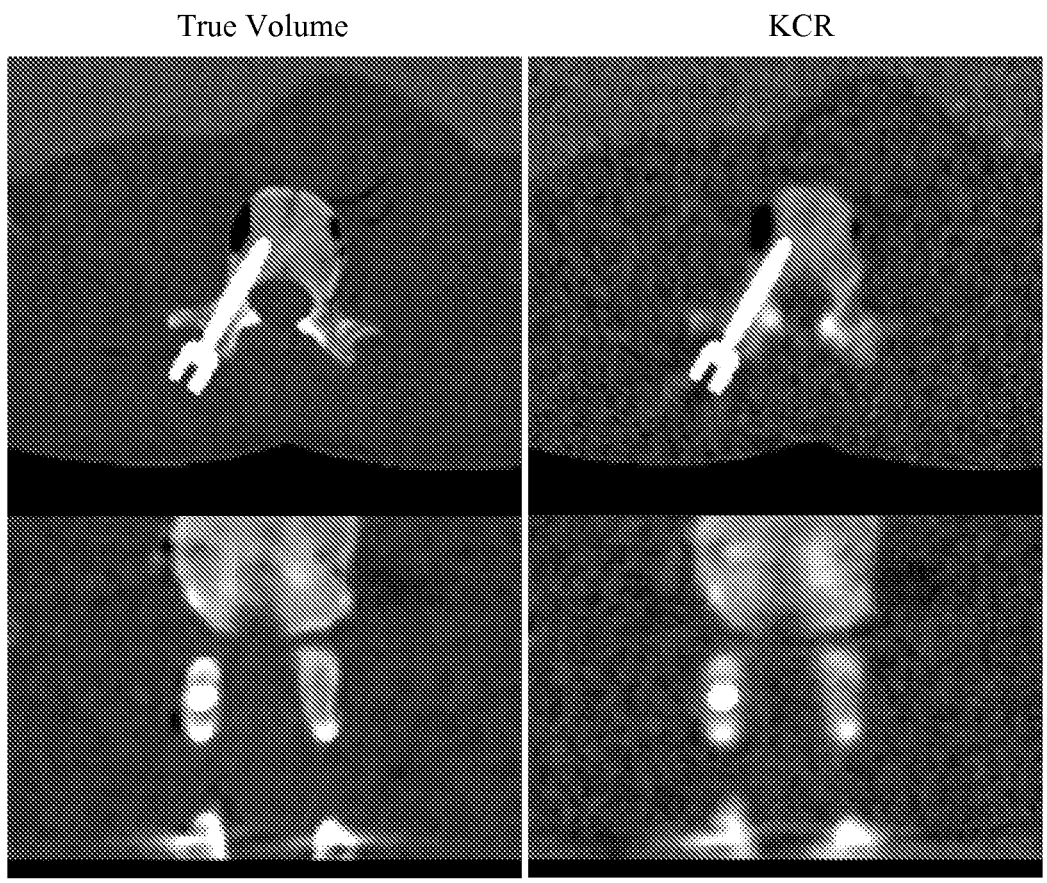
FIG. 9 illustrates exemplary attenuation images according to an embodiment of the current invention.

FIG. 9 illustrates exemplary attenuation images according to an embodiment of the current invention. Illustration of the total attenuation ($\mu$) for the single component unilateral screw case: (Left) True phantom, (Right) KCR. Since KCR estimates both the background attenuation ($\mu^*$) and the registration parameters, $\Lambda$, one may represent the result as either a traditional attenuation image (Error! Reference source not found. (right)) or with an overlay (Error! Reference source not found.8 (right))—whichever better suits display preferences and dynamic range. The window and level for all images is 800 and 300 HU, respectively.

It is noted that, if desired, one may always show a traditional attenuation image using (4) for KCR without an overlay—e.g., for the single-component unilateral screw case as shown in FIG. 9. Axial and coronal images are shown for each reconstruction technique and each screw placement scenario. The coronal slice was chosen to illustrate placement of the screw through the pedicle. This view is of particular clinical importance in assessing possible breach of the screw through the cortical bone—e.g., lateral breach (suboptimal screw placement) or medial breach (intrusion on the spinal canal).

At the $10^4$ photons exposure level, photon starvation artifacts due to the high attenuation of the screw are very apparent in the FBP reconstructions. These artifacts strongly diminish the low and medium contrast details in the surrounding areas in the axial images, and are worst for the bilateral screw placement scenario (which exhibits the greatest amount of photon starvation due to the increased amount of metal in the volume). In comparison, the PL images are significantly improved and eliminate most of the streak artifacts. However, there are still significant residual artifacts, particularly near the boundary of the screws, which obscure much of the vertebra and confound assessment of possible cortical breach in the coronal images. The KCR approach produces images that are nearly artifact-free. While there are some residual artifacts (most notably at the head of the screw), the contrast of the artifacts is extremely low compared to both FBP and PL. Moreover, the coronal images easily demonstrate the lack of cortical breaches in screw placement and agree well with the true volume images. The image quality for the KCR approach remains high even near the boundary of the screw.

Figure 10:
FIG. 10 illustrates exemplary attenuation images in a unilateral single-component screw case according to an embodiment of the current invention.

FIG. 10 illustrates exemplary attenuation images in a unilateral single-component screw case according to an embodiment of the current invention. The effect of varying the regularization parameter in KCR is illustrated. While there is a clear noise-resolution trade-off (viz., larger $\beta$ decreasing the noise and sacrificing spatial resolution), all of the images are largely free of streak artifacts. The window and level for all images is 500 and 150 HU, respectively.

FIG. 10 shows the unilateral single-component screw case across a range of regularization parameters. Specifically, the same regularization parameter was used as in the previous study along with a value of $\beta$ ten times greater and a value ten times less. The varying levels of regularization illustrate the expected increase in noise with lower β and decreasing spatial resolution with higher β. However, it is noted that all of the images are essentially free of the streaks associated with photon starvation due to the screw. This suggests that the streak elimination is not simply due to regularization, and that the integration of prior knowledge regarding the structure and composition of the screw does indeed improve the reconstruction. It is noted that lower regularization values appear to converge more slowly, and the KCR objective function may be more susceptible to local minima (particularly with respect to registration parameters) when the volume estimate becomes very noisy. The error in the translation estimate was 0.31, 0.13, and 0.05 voxels for the three regularization cases in FIG. 10, ordered from lowest to highest β. Similarly, the mean absolute angular error was 0.24, 0.09, and 0.04 degrees. Thus, across this particular range of β, translation estimates appeared to benefit from increased regularization.

Section III: Discussion

This example describes a novel tomographic reconstruction approach referred to as KCR that allows for incorporation of known components into the object model. The position and pose of such components are estimated simultaneously with the background attenuation. Application of this technique was demonstrated in images containing metallic pedicle screws within a spine surgery context, but the technique is general for any kind of component for which the shape and composition is known—including objects with heterogeneous composition. In simulated pedicle screw reconstructions, KCR largely eliminated artifacts associated with photon starvation and allowed clear visualization of anatomy right up to the boundary of the implant, whereas traditional FBP and PL approaches had substantial artifacts. As such, the KCR method is anticipated to hold significant promise in cone-beam CT (CBCT)-based imaging for interventional guidance—e.g., in spine procedures [J. H. Siewerdsen, et al., "Volume CT with a flat-panel detector on a mobile, isocentric C-arm: Pre-clinical investigation in guidance of minimally invasive surgery," Medical Physics, vol. 32, pp. 241-254, January 2005] as well as a host of other interventions for which the introduction of a surgical device confounds 3D image quality. Moreover, KCR may be an important tool in dose reduction, since it allows for successful operation in a photon starvation regime. KCR may be important in the context of other applications, such as hip and knee implants and CT-based biopsy needle guidance. Straightforward extensions of the KCR methodology that use edge-preserving penalties/priors [K. Lange, "Convergence of EM image reconstruction algorithms with Gibbs smoothing," IEEE Trans Med Imaging, vol. 9, pp. 439-46, 1990; C. R. Vogel and M. E. Oman, "Fast, robust total variation-based reconstruction of noisy, blurred images," IEEE Trans Image Process, vol. 7, pp. 813-24, 1998] may also be used, which may provide further improved noise-resolution tradeoffs.

The basic KCR framework described above uses a forward model that does not incorporate a polyenergetic beam and the physics (e.g., scatter) associated with a spectrum of x-rays. However, polyenergetic forward models [B. De Man, et al., "An iterative maximum-likelihood polychromatic algorithm for CT," IEEE Trans Med Imaging, vol. 20, pp. 999-1008, October 2001; I. A. Elbakri and J. A. Fessler, "Statistical image reconstruction for polyenergetic X-ray computed tomography," IEEE Trans Med Imaging, vol. 21, pp. 89-99, February 2002; I. A. Elbakri and J. A. Fessler, "Segmentation-free statistical image reconstruction for polyenergetic x-ray computed tomography with experimental validation," Phys Med Biol, vol. 48, pp. 2453-77, Aug. 7, 2003; S. Srivastava and J. A. Fessler, "Simplified statistical image reconstruction algorithm for polyenergetic X-ray CT," 2005 IEEE Nuclear Science Symposium Conference Record, Vols 1-5, pp. 1551-1555, 2005] may be incorporated. Such modifications will likely be important to application in real clinical data since beam hardening is a major contributor to metal artifacts. Similarly, it is straightforward to include a known scatter fraction in the forward model.

One potential limitation of this particular implementation of the KCR framework arises in cases where one has inexact knowledge of certain components—for example: metal rods used in vertebral fixation that are bent during the surgical procedure; knee or hip implants that have experienced significant wear prior to a surgical revision; or needle guidance in which the needle flexes upon insertion. However, it is noted that the mapping in (9) allows straightforward modification to a deformable registration model to encompass some of these scenarios (particularly when the differences can be expressed in a relatively low-dimensional parameter space).

The results summarized above focused largely on the image quality resulting from KCR; however, there are two outputs from the estimator: the image volume and the registration parameters. The image volume is likely the primary outcome, but the accurate estimation of the pose values themselves may also have clinical value in assessing the placement of components introduced in the body. For example, the pose output of the KCR method allows comparison of pre-operative planning to the actual device delivery and may offer value in quantifying surgical precision.

We claim:

1. An imaging system for processing image data of an object containing a component, comprising:
   an imaging device arranged to obtain image data;
   a processor adapted to:
      receive the image data from the imaging device;
      obtain a component model for the component;
      obtain an imaging device model for the imaging device;
      construct an unconstrained objective function based on the component model and the imaging device model; and
      construct a model of the object containing the component based on the unconstrained objective function and the image data; and
   a display device adapted to display an image for the object containing the component based on the model.

2. The imaging system of claim 1, wherein the processor is adapted to construct the model of the object containing the component based on:
   solving the unconstrained objective function for the image data based on changing registration parameters and image parameters in the unconstrained objective function,
   wherein constructing the model of the object containing the component is based on the image parameters and the registration parameters for the solved unconstrained objective function.

3. The imaging system of claim 2, wherein the processor is adapted to solve the unconstrained objective function based on:
   optimizing the unconstrained objective function for the image data based on changing the registration parameters while holding the image parameters constant; and
   optimizing the unconstrained objective function for the image data based on changing the image parameters while holding the optimized registration parameters constant.

4. The imaging system of claim 1, wherein the registration parameters specify a location and an orientation of the component.

5. The imaging system of claim 1, wherein the image parameters specify parameterization characteristics of the object containing the component.

6. The imaging system of claim 1, wherein the component model defines parameterization characteristics and registration characteristics of the component.

7. The imaging system of claim 1, wherein the imaging device model defines characteristics for constructing the model of the object containing the component based on characteristics of the imaging device.

8. The method of claim 1, wherein constructing the unconstrained objective function is based on the component model, a second component model for a second component in the object containing the component, and the imaging device model.

9. A method for processing image data for an object containing a component, comprising:
    receiving the image data from an imaging device;
    obtaining a component model for the component;
    obtaining an imaging device model for the imaging device;
    constructing an unconstrained objective function based on the component model and the imaging device model; and
    constructing a model of the object containing the component based on the unconstrained objective function and the image data.

10. The method of claim 9, wherein constructing the model of the object containing the component comprises solving the unconstrained objective function for the image data based on changing registration parameters and image parameters in the unconstrained objective function,
    wherein constructing the model of the object containing the component is based on the image parameters and the registration parameters for the solved unconstrained objective function.

11. The method of claim 10, wherein solving the unconstrained objective function comprises:
    optimizing the unconstrained objective function for the image data based on changing the registration parameters while holding the image parameters constant; and
    optimizing the unconstrained objective function for the image data based on changing the image parameters while holding the optimized registration parameters constant.

12. The method of claim 10, wherein the registration parameters specify a location and an orientation of the component.

13. The method of claim 10, wherein the image parameters specify parameterization characteristics of the object containing the component.

14. The method of claim 10, wherein the component model defines parameterization characteristics and registration characteristics of the component.

15. The method of claim 10, wherein the imaging device model defines characteristics for constructing the model of the object containing the component based on characteristics of the imaging device.

16. The method of claim 10, wherein constructing the unconstrained objective function is based on the component model, a second component model for a second component in the object containing the component, and the imaging device model.

17. A non-transitory machine readable storage medium that provides instructions, which when executed by a computing platform, cause said computing platform to perform operations comprising a method for processing image data for an object containing a component, the method comprising:
    receiving image data from an imaging device;
    obtaining a component model for the component;
    obtaining an imaging device model for the imaging device;
    constructing an unconstrained objective function based on the component model and the imaging device model; and
    constructing a model of the object containing the component based on the unconstrained objective function and the image data.

* * * * *